United States Patent
Ma

(10) Patent No.: US 11,536,891 B2
(45) Date of Patent: Dec. 27, 2022

(54) OPTICAL WAVEGUIDE COMPRISING A BEAM IN-COUPLING REGION AND A BEAM COUPLING-OUT REGION EACH PROVIDED WITH A COUPLING GRATING AND DISPLAY DEVICE

(71) Applicant: BOE TECHNOLOGY GROUP CO., LTD., Beijing (CN)

(72) Inventor: Sen Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 285 days.

(21) Appl. No.: 16/954,204

(22) PCT Filed: Jan. 6, 2020

(86) PCT No.: PCT/CN2020/070428
§ 371 (c)(1),
(2) Date: Jun. 15, 2020

(87) PCT Pub. No.: WO2020/173224
PCT Pub. Date: Sep. 3, 2020

(65) Prior Publication Data
US 2021/0223461 A1   Jul. 22, 2021

(30) Foreign Application Priority Data

Feb. 28, 2019   (CN) .......................... 201910151707.5

(51) Int. Cl.
*F21V 8/00*  (2006.01)
*G02B 27/01* (2006.01)

(52) U.S. Cl.
CPC ....... *G02B 6/0055* (2013.01); *G02B 27/0172* (2013.01)

(58) Field of Classification Search
CPC .............................................. G02B 2027/0125
See application file for complete search history.

(56) References Cited

U.S. PATENT DOCUMENTS

2016/0231568 A1* 8/2016 Saarikko .............. G02B 6/0035
2017/0299860 A1* 10/2017 Wall ........................ G02B 3/04
(Continued)

FOREIGN PATENT DOCUMENTS

| CN | 107085264 A | * | 8/2017 | ............. G02B 6/122 |
| CN | 107966820 A |   | 4/2018 | |
| CN | 107249868 B | * | 5/2020 | ....... B29D 11/00663 |

OTHER PUBLICATIONS

CN First Office Action in Application No. 201910151707.5, dated Feb. 6, 2020.

*Primary Examiner* — Paul C Lee
(74) *Attorney, Agent, or Firm* — Syncoda LLC; Feng Ma

(57) ABSTRACT

An optical waveguide includes an optical waveguide body having a beam in-coupling region and a beam coupling-out region, wherein: the beam in-coupling region is provided with a coupling grating configured to couple a beam into the optical waveguide body, and have the beam propagate in a total reflection manner in the optical waveguide body; the beam coupling-out region is provided with an out-coupling grating configured to couple the light beam propagating to the beam coupling-out region out of the optical waveguide body, such that the beam does not undergo secondary diffraction at the coupling grating and have continuous exit pupil expansion; and the out-coupling grating includes a transmissive out-coupling grating and a reflective out-coupling grating disposed on two sides of the optical waveguide body parallel to a beam propagation direction.

12 Claims, 7 Drawing Sheets

(56) References Cited

U.S. PATENT DOCUMENTS

2017/0299865 A1* 10/2017 Vallius ............... G02B 27/0081
2017/0315346 A1* 11/2017 Tervo ................... G02B 5/1819
2017/0357089 A1* 12/2017 Tervo ................... G02B 6/0026

* cited by examiner

OPTICAL WAVEGUIDE COMPRISING A BEAM IN-COUPLING REGION AND A BEAM COUPLING-OUT REGION EACH PROVIDED WITH A COUPLING GRATING AND DISPLAY DEVICE

CROSS-REFERENCE TO RELATED APPLICATION

The present application is a national stage of International Application No. PCT/CN2020/070428 filed on Jan. 6, 2020, which claims priority to Chinese Patent Application No. 201910151707.5 filed on Feb. 28, 2019. The disclosures of these applications are hereby incorporated by reference in their entirety.

FIELD

The present disclosure relates generally to the field of display technologies, and more specifically to an optical waveguide and a display device.

BACKGROUND

Augmented Reality (AR) display device can display virtual image information, and can integrate a real background environment to realize organic combination of virtual and reality. Therefore, it can be widely used in many fields such as simulation training, video games, microscopy, surgery, etc. AR display devices are mainly head-mounted. As such, an AR device may be required to be thin and light to meet long-term wearing comfort.

SUMMARY

Various embodiments of the present disclosure provide an optical waveguide and a display device.

In a first aspect, an optical waveguide is provided, including an optical waveguide body having a beam in-coupling region and a beam coupling-out region, wherein:

the beam in-coupling region is provided with a coupling grating configured to couple a beam into the optical waveguide body, and have the beam propagate in a total reflection manner in the optical waveguide body;

the beam coupling-out region is provided with an out-coupling grating configured to couple the light beam propagating to the beam coupling-out region out of the optical waveguide body, such that the beam does not undergo secondary diffraction at the coupling grating and have continuous exit pupil expansion; and the out-coupling grating includes a transmissive out-coupling grating and a reflective out-coupling grating disposed on two sides of the optical waveguide body parallel to a beam propagation direction.

In some embodiments, a first end of the transmissive out-coupling grating and a first end of the reflective out-coupling grating are disposed in a misalignment setting along the beam propagation direction in the optical waveguide body.

In some embodiments, a first distance between the first end of the reflective out-coupling grating and the in-coupling grating in the beam propagation direction is smaller than a second distance between the first end of the transmissive out-coupling grating and the in-coupling grating in a beam propagation direction.

In some embodiments, a first distance between the first end of the reflective out-coupling grating and the in-coupling grating in the beam propagation direction is greater than a second distance between the first end of the transmissive out-coupling grating and the in-coupling grating in the beam propagation direction.

In some embodiments, a misalignment interval between the first end of the transmissive out-coupling grating and the first end of the reflective out-coupling grating is one half of a propagation step that the beam is totally reflected to propagate in the optical waveguide body.

In some embodiments, a maximum misalignment interval between an initial end of the transmissive coupling grating and an initial end of the reflective coupling grating is half of the propagation step of the light propagating within the optical waveguide body in a total reflective manner when the beam enters the optical waveguide body at a maximum field of view angle.

In some embodiments, a second end of the transmissive coupling grating and a second end of the reflective coupling grating are misaligned along the light beam propagation direction.

In some embodiments, the second end of the reflective out-coupling grating is located at a side of the transmissive out-coupling grating proximal to the beam in-coupling region.

In some embodiments, the second end of the reflective out-coupling grating is located at a side of the transmissive out-coupling grating that is distal from the beam in-coupling region.

In some embodiments, a misalignment interval between the second end of the transmissive out-coupling grating and the second end of the reflective out-coupling grating is half of the propagation step of the light beam propagating in a total reflection manner inside of the optical waveguide body.

In some embodiments, a maximum misalignment interval between the second end of the transmissive out-coupling grating and the second end of the reflective out-coupling grating is half of a propagation step of the light propagating in a total reflective manner within the optical waveguide body in a case that the light beam enters the optical waveguide at a minimum field of view angle.

In some embodiments, parameters of the in-coupling grating and the out-coupling grating satisfy:

$$2T\cdot\tan\{\arcsin[\lambda/(nd)+\sin i_{min}/n]\} \geq D \qquad (1)$$

$$T\cdot\tan[\arcsin(\sin i_{max}/n)]+T\cdot\tan\{\arcsin[\lambda/(nd)+\sin i_{max}/n]\} \leq D \qquad (2)$$

wherein:
n is a refractive index of the optical waveguide body;
T is a thickness of the optical waveguide body;
d is a period of the coupling grating;
periods of the in-coupling grating and the out-coupling grating are same;
D is a width of the in-coupling grating in the beam propagation direction;
$\lambda$ is a wavelength of the light beam incident on the optical waveguide body;
$i_{min}$ is a minimum field of view angle of the light beam incident on the optical waveguide body; and
$i_{max}$ is a maximum field of view angle of the beam incident on the optical waveguide body.

In some embodiments, in a case that the light beam incident on the optical waveguide body has a specified spectral width, a minimum wavelength $\lambda_{min}$ of the light beam satisfies formula (1), and a maximum wavelength $\lambda_{max}$ of the light beam satisfies formula (2).

In some embodiments:

the beam in-coupling region includes an incident surface, and a second surface opposing the incident surface; and the in-coupling grating is a reflective in-coupling grating, and is disposed at the second surface.

In another aspect, a display device is provided, including the optical waveguide described above.

In some embodiments, the display device includes an augmented reality (AR) device.

In some embodiments, the transmissive out-coupling grating and the reflective out-coupling grating are misaligned.

In some embodiments:

a last (Nth) extended exit pupil of the reflective out-coupling grating and the transmissive out-coupling grating are EUN and EDN, respectively; and a size of a misalignment interval between EUN and EDN is half of a minimum total reflection step, i.e., Smin/2, wherein:

$$S_{min}=2T\cdot\tan\{\arcsin[\lambda/(nd)+\sin i_{min}/n]\} \quad (b)$$

In some embodiments, the optical waveguide includes a holographic waveguide.

In some embodiments, the display device further includes a spectroscopic film configured to reduce a total reflection step size.

In some embodiments:

a maximum misalignment interval between a first end of the transmissive out-coupling grating and a first end of the reflective out-coupling grating is half of a propagation step that the light beam incident on the optical waveguide body at a maximum field of view angle and propagating within the optical waveguide body in a total reflection manner, i.e., $S_{max}/2$, $$S_{max}=2T\cdot\tan\{\arcsin[\lambda/(nd)+\sin i_{max}/n]\} \quad (a)$$

wherein $i_{max}$ is the maximum field of view angle.

It is to be understood that the above general descriptions and the detailed descriptions below are only exemplary and explanatory, and are not intended to limit the present disclosure.

BRIEF DESCRIPTION OF THE DRAWINGS

To more clearly illustrate some of the embodiments, the following is a brief description of the drawings. The drawings in the following descriptions are only illustrative of some embodiments. For those of ordinary skill in the art, other drawings of other embodiments can become apparent based these drawings.

DETAILED DESCRIPTION

Figure 1:
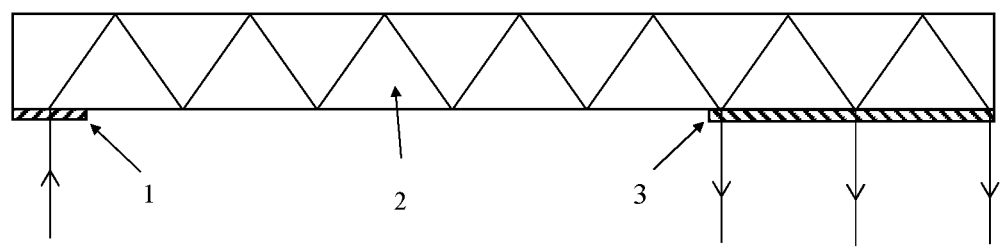
FIG. 1 is a schematic view of an optical waveguide according to some embodiments of the present disclosure.

The embodiments set forth below represent the necessary information to enable those of ordinary skill in the art to practice the embodiments and illustrate the best mode of practicing the embodiments. Upon reading the following description in light of the accompanying drawing figures, those of ordinary skill in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Relative terms such as "below" or "above" or "upper" or "lower" or "horizontal" or "horizontal" can be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In various implementations of the AR display devices, holographic optical waveguide technologies can be adopted, employing a slab waveguide as a light propagation medium, and employing a hologram element as an optical path folding device, which can have advantages of simple structure, light weight, and small size.

According to some embodiments of the present disclosure, the incident light is coupled into the optical waveguide by undergoing diffraction and being coupled into the grating. In a situation that the beam diffraction angle is smaller than the total reflection critical angle of the optical waveguide, the light beam will propagate forward in the optical waveguide by means of total reflection.

The structure of the out-coupling grating can be symmetrical with the in-coupling grating, such that the light beam propagates to the out-coupling grating and is diffracted from the optical waveguide, and the exit angle is symmetric with the angle of the incident light.

In order to ensure that a user's eye can observe the image within a certain range, it may be needed for the light beam to carry out expansion of exit pupil, and the diffraction efficiency distribution of the grating is coupled by a reasonable setting, such that the light beam is partially coupled out of the optical waveguide when the light beam is coupled out of the grating, and the remaining energy continues to be directed forward. As such, the beam can be coupled out of the grating multiple times, achieving an exit pupil expansion.

Generally, a holographic optical waveguide requires no secondary diffraction at the in-coupling grating to ensure efficient use of energy. Meanwhile, it may be needed that the extended exit at the out-coupling grating is continuous to ensure continuity of observation. These two conditions may be contradictory in the light path. As such, complicated light path designs may be needed to satisfy both conditions.

A holographic optical waveguide 2 according to some embodiments is illustrated in FIG. 1.

The incident light can be diffracted by the in-coupling grating 1 and coupled into the optical waveguide 2. In a case that the beam diffraction angle is smaller than the total reflection critical angle of the optical waveguide 2, the beam will propagate forward in a total reflection manner in the optical waveguide 2.

The structure of the out-coupling grating 3 can symmetrical with the in-coupling grating 1, such that the light beam propagates to the out-coupling grating 3 to be diffracted from the optical waveguide 2, and the exit angle is symmetric with the angle of the incident light.

In order to ensure that the user's eye can observe the image within a certain range, it may be needed for the light beam to carry out exit pupil expansion, and the diffraction efficiency distribution of the out-coupling grating 3 is coupled by a reasonable arrangement, such that the light beam is partially coupled to the optical waveguide 2 when the light beam is coupled out of the out-coupling grating 3, and the remaining energy continues to propagate forward such that the beam passes through the out-coupling grating 3 multiple times, achieving an exit pupil expansion.

In order to ensure the effective use of energy, it may be needed to ensure that the second diffraction does not occur at the in-coupling grating 1. After being coupled into the in-coupling grating 1, all the energy can be propagated forward in a total reflective manner in the optical waveguide 2. In this situation, the minimum step size of total reflection propagation (i.e., the minimum total reflection step size) is no less than the beam width.

Figure 2:
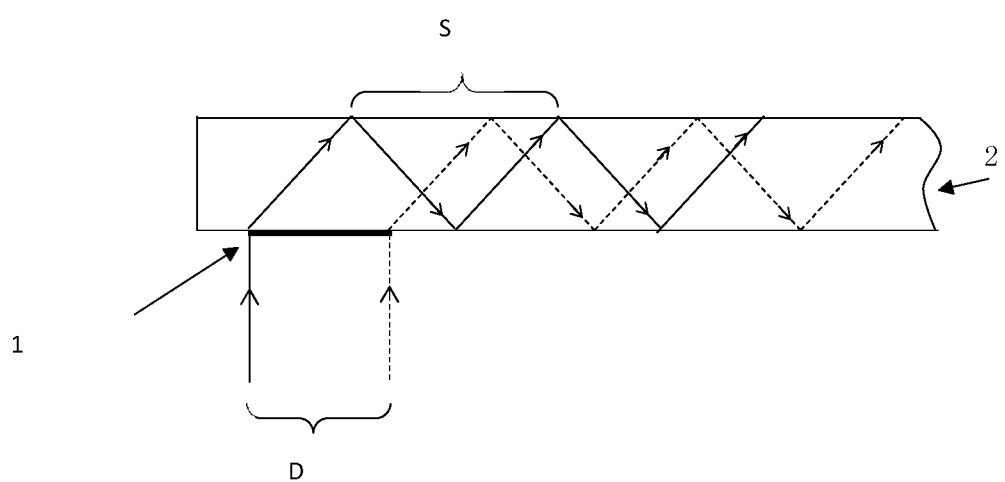
FIG. 2 is a first schematic diagram illustrating a relationship between a total reflection step size and a second diffraction according to some embodiments of the present disclosure.

FIG. 2 is a schematic diagram illustrating where secondary diffraction does not occur.

In FIG. 2, the total reflection step size S is greater than the beam width D, and the beam width is equal to the width of the in-coupling grating 1. The light coupled into the optical waveguide 2 via the in-coupling grating 1 is not incident on the in-coupling grating 1 again after one total reflection.

Figure 3:
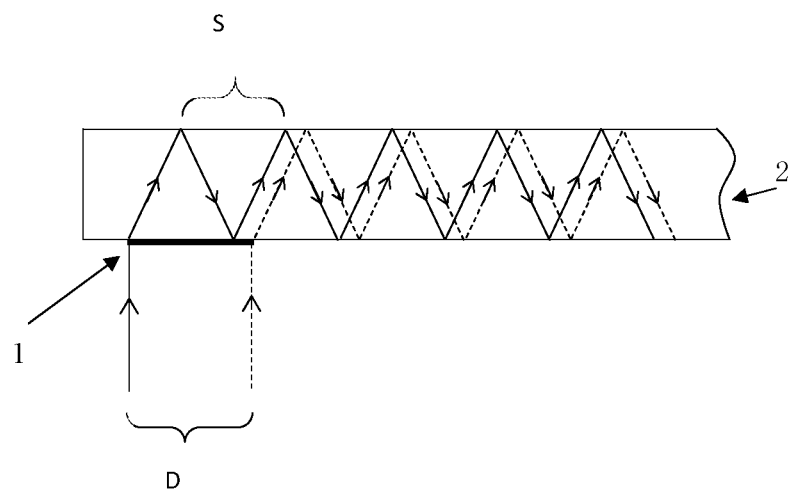
FIG. 3 a second schematic diagram of the relationship between the total reflection step size and the second diffraction.

In a case that the total reflection step S is smaller than the beam width D, a schematic diagram of the second diffraction can be illustrated in FIG. 3.

In FIG. 3, after the light is coupled into the optical waveguide 2 via in-coupling grating 1 and reflected totally once, a part of the light beam will be incident on the in-coupling grating 1 again, and secondary diffraction occurs, resulting in energy loss and produce stray light.

In order to ensure the continuity of the observation, for example, the image does not flicker or jump when the user's eye continuously moves within a certain range, it may be needed to ensure the continuous distribution of the exit pupil expansion.

Therefore, the maximum step size of the total reflection propagation of the light beam in the optical waveguide 2 is required (i.e., the maximum total reflection step size) should not be greater than the beam width.

Figure 4:
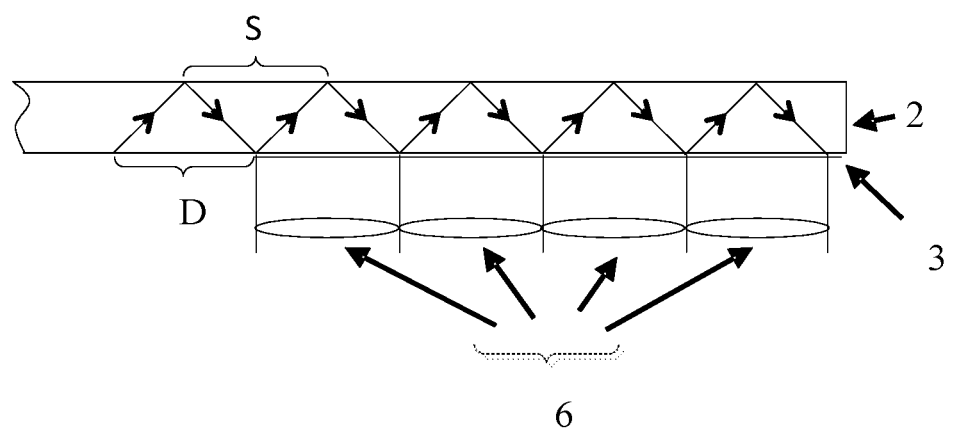
FIG. 4 is a first schematic diagram illustrating a relationship between the total reflection step size and an exit pupil continuity.

FIG. 4 is a schematic diagram of the exit pupil expansion 6 continuously.

Figure 5:
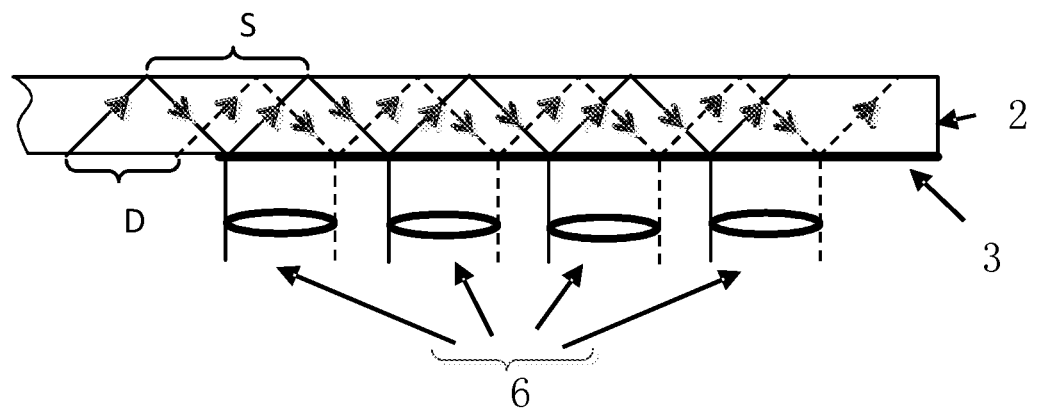
FIG. 5 is a second schematic diagram illustrating the relationship between the total reflection step size and the exit pupil continuity.

FIG. 5 is a schematic diagram of the exit pupil expansion 6 discontinuity.

In FIG. 4, the total reflection step size S is equal to the beam width D. Otherwise, there will be a case where the expansion is discontinuous.

In FIG. 5, the total reflection step size S is larger than the beam width D, and the flickering of the image (i.e., the brightness changes) can be felt when the user's eye moves to the interval of the exit pupil 6.

Apparently, it may be contradictory to ensure that the in-coupling grating 1 does not cause secondary diffraction, and to ensure the continuity of the exit pupil expansion 6.

In the case that the in-coupling grating 1 does not cause secondary diffraction, the exit pupil expansion 6 should be discontinuous. In the case that the exit pupil expansion 6 is continuous, the second diffraction can be ensured to occur in the in-coupling grating 1.

It may be needed to achieve another condition by an additional design when one of the conditions is guaranteed. For example, when the continuity of the exit pupil expansion 6 is satisfied, in order to solve the secondary diffraction problem of the in-coupling grating 1, the angle-sensitive property of the volume holographic grating can be utilized, and the in-coupling grating 1 can be designed as a multilayer holographic grating.

Each layer of the holographic grating can have different Bragg angles. All Bragg angles can be superimposed to obtain the range of the field of view angle of the system. The incident angle of the secondary incident to the in-coupling grating 1 is usually outside the range of the field of view angle, which does not satisfy the Bragg condition of the volume holographic grating. As such, the diffraction efficiency of the second diffraction can be very low, and the energy loss due to the second diffraction can be small.

However, the design difficulty and processing difficulty of the multilayer holographic grating are high, which can greatly increase the system cost.

For example, when the in-coupling grating 1 does not have secondary diffraction, in order to solve the problem of continuous exit pupil expansion, a layer of spectroscopic film can be added in the middle of the region where the optical waveguide 2 is provided with the out-coupling grating 3, thereby reducing total reflection step size.

Figure 6:
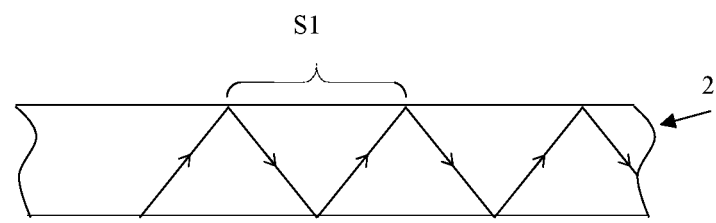
FIG. 6 is a schematic view illustrating the structure of an optical waveguide without a spectroscopic film.

FIG. 6 shows a schematic view of the structure of the optical waveguide 2 without the spectroscopic film 7.

Figure 7:
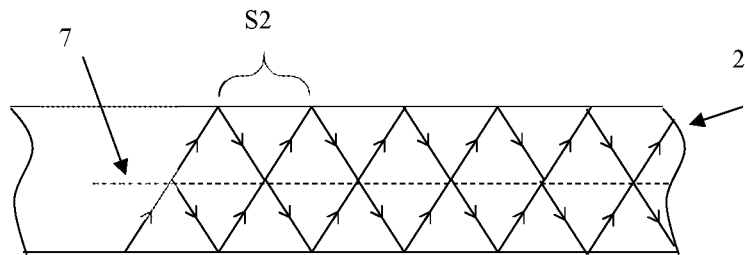
FIG. 7 is a schematic view illustrating the use of a spectroscopic film to reduce the total reflection step size.

FIG. 7 shows a schematic view of the structure of the optical waveguide 2 for adding the spectroscopic film 7, and FIG. 6 only schematically shows the propagation of a light beam.

In FIG. 6, the optical waveguide 2 is an independent and complete planar waveguide, and the total reflection step of the beam is S1.

In FIG. 7, the optical waveguide 2 employed comprises two thin optical waveguides 2 glued together, and the interface is plated with the spectroscopic film. With respect to the optical waveguide 2 in FIG. 6, it reduces the total reflection step size to S2. However, this method not only increases the processing cost, but also reduces the transmittance of the optical waveguide 2, which directly affects the user experience.

Various embodiments of the present disclosure can provide an optical waveguide in which a transmissive out-coupling grating 32 is disposed on a light-emitting surface of a beam coupling-out region, and a reflective out-coupling grating 31 is disposed on a first surface of the beam coupling-out region opposite to the light-emitting surface.

Meanwhile, the two apparently-contradictory conditions of the second diffraction not occurring at the in-coupling grating 1 region and the continuous exit pupil expansion at the out-coupling grating region can be ensured. Simpler structures and processes can therefore be achieved, and the cost is lower.

Figure 8:
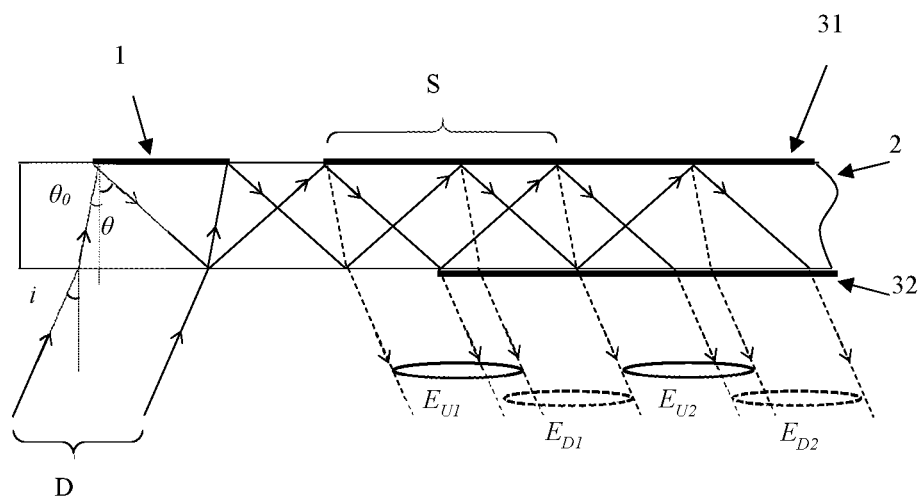
FIG. 8 is a first schematic diagram illustrating the first end misalignment setting of the transmissive out-coupling grating and the reflective grating according to some embodiments of the present disclosure.
Figure 13:
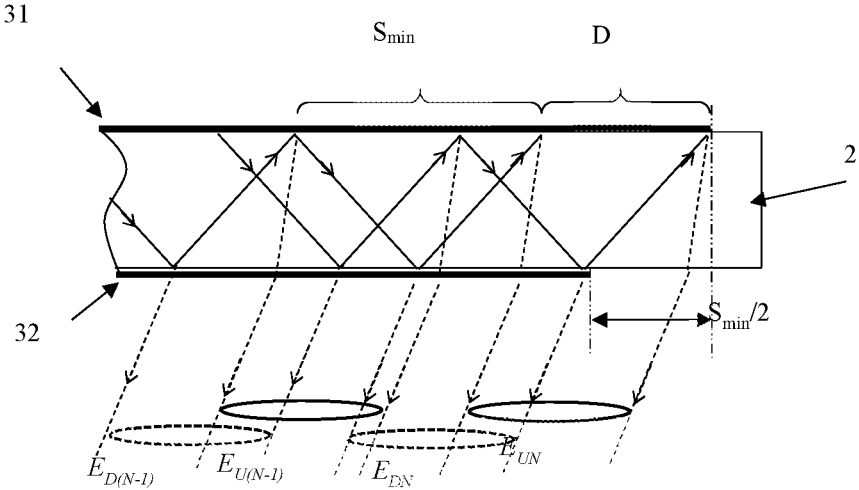
FIG. 13 is a second schematic diagram illustrating the misalignment arrangement of the end of the transmissive out-coupling grating and the second end of the reflective grating according to some embodiments of the present disclosure.

Specifically, as shown in FIG. 8 though FIG. 13, the optical waveguide according to some embodiments of the present disclosure can include an optical waveguide body 2. The optical waveguide body 2 can include a beam in-coupling region and a beam coupling-out region:

The beam in-coupling region can be provided with an in-coupling grating 1 configured to couple a light beam into the optical waveguide body 2 and propagate in a total reflection manner in the optical waveguide body 2;

The beam coupling-out region can be provided with an out-coupling grating configured to couple a light beam propagating to the beam coupling-out region out of the optical waveguide body 2, such that the beam does not undergo secondary diffraction at the in-coupling grating 1 region, and continuously expand to exit pupil;

The out-coupling grating includes a transmissive out-coupling grating, and a reflective out-coupling grating disposed on two sides of the optical waveguide body parallel to the beam propagation direction.

It should be noted that, in these embodiments, the optical waveguide body can be a planar optical waveguide, and the beam in-coupling region and the beam coupling-out region can be respectively disposed at two ends of the optical waveguide body along a beam propagation direction. Other configurations are possible according to some other embodiments.

In some embodiments of the embodiments, the beam coupling-out region can include a light emitting surface and a first surface disposed opposite to the light emitting surface. The transmissive out-coupling grating 32 can be disposed on the light emitting surface. The reflective out-coupling grating 31 is disposed on the first surface.

It should be understood that the direction of beam propagation as described above or below can be the direction of propagation of the beam within the body of the optical waveguide.

FIG. 8 is a schematic diagram illustrating the propagation of a light beam incident on the field of view i, and having a width D.

By adopting the above scheme, the two apparently-contradictory conditions of no secondary diffraction at the in-coupling grating 1, and continuous expansion at the out-coupling grating, can be ensured at the same time.

The optimization of the parameters such as the width of the grating region (length in the direction of beam propagation), grating period, the thickness of the optical waveguide, and the refractive index can effectively ensure that the in-coupling grating 1 can be continuously diverged without secondary diffraction.

In these embodiments, the beam in-coupling region includes an incident surface and a second surface opposite to the incident surface, and the in-coupling grating 1 is a reflective in-coupling grating 1 and disposed on the second surface.

It should be understood that, in implementations, the position where the in-coupling grating 1 is disposed is not limited to being disposed on the second surface, nor is it limited to the reflective in-coupling grating 1. In some embodiments, the in-coupling grating 1 may also be transmissive in-coupling grating 1 and disposed on the light incident surface.

In addition, in these embodiments, the light incident surface of the light beam in-coupling region and the light exit surface of the light beam coupling-out region are located on the same side of the optical waveguide body 2, but are not limited thereto.

Due to the limitation of the observer's observation area, the transmissive out-coupling grating 32 can be too long to be meaningful. Reasonably shortening the length of the transmissive out-coupling grating 32 can save cost. Therefore, in some embodiments of the present disclosure, in the direction of propagation of the light beam within the waveguide body 2, the initial end of the transmissive out-coupling grating 32 can be misaligned with the initial end of the reflective out-coupling grating 31.

In some embodiments, an initial end of the reflective out-coupling grating 31 is located at a side of the initial end of the transmissive out-coupling grating 32 near the in-coupling grating 1, that is, a first distance between an initial end of the reflective out-coupling grating 31 and the in-coupling grating 1 in the beam propagation direction can be smaller than a second distance between the initial end of the transmissive out-coupling grating 32 and the in-coupling grating 1 in the beam propagation direction, as shown in FIG. 8;

Alternatively, the initial end of the reflective out-coupling grating 31 can be located at a side of the initial end of the transmissive out-coupling grating 32 distal from the in-coupling grating.

Figure 9:
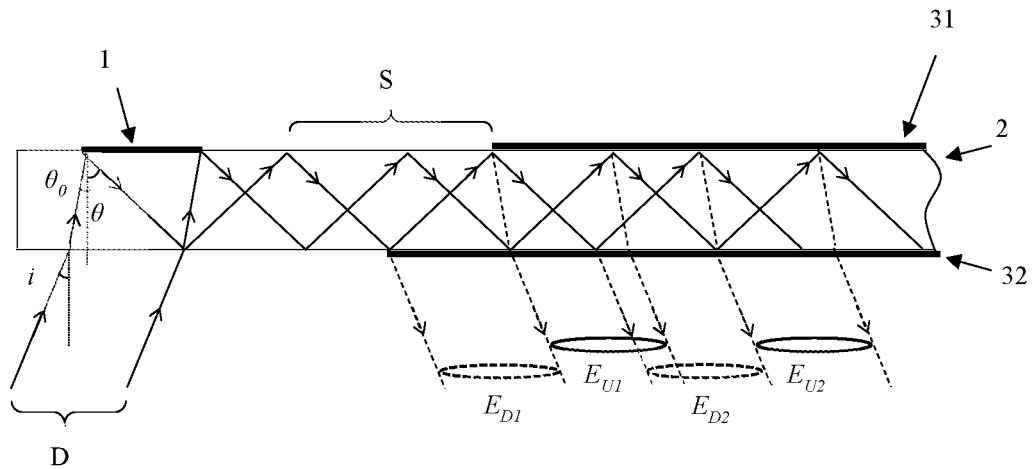
FIG. 9 is a second schematic diagram illustrating the initial end misalignment setting of the transmissive out-coupling grating and the reflective grating according to some embodiments of the present disclosure.

For example, the first distance between the initial end of the reflective out-coupling grating 31 and the couple-in grating 1, in the direction of beam propagation, is greater than the second distance of the initial end of the transmissive out-coupling grating 32 and the in-coupling grating 1 in the direction of beam propagation, as shown in FIG. 9.

In these embodiments, the propagation distance of the light beam from the first incident on the reflective out-coupling grating 31 to the first incident on the transmissive out-coupling grating 32 can be half the total reflection step, or the distance from the first light incident on the transmissive out-coupling grating 32 to the first light incident on the reflective out-coupling grating 31 can be half the total reflection step. The misalignment interval between the initial end of the transmissive out-coupling grating 32 and the initial end of the reflective out-coupling grating 31 can be half of the propagation step of the light beam propagating within the optical waveguide body 2 in a total reflection manner.

A specific process of coupling the light beam into the optical waveguide body 2 can be that a light beam having an field of view angle i is incident on the optical waveguide body 2, and is refracted by the optical waveguide body 2 with an angle represented by $\theta_0$, wherein $\theta_0$=arcsin(sin i/n).

After being refracted by the optical waveguide body 2, the light beam entering the optical waveguide body 2 is diffracted after being incident on the in-coupling grating 1 at an angle $\theta_0$, and the diffraction angle is expressed as $\theta$.

For +1 order diffraction, $\theta$=arcsin[$\lambda$/(nd)+sin $\theta_0$], where $\lambda$ is the wavelength of the incident light (i.e., beam light incident into the optical waveguide body 2).

When $\theta$ is larger than the total reflection critical angle of the optical waveguide body 2, it will propagate forward in the optical waveguide body 2 in the form of total reflection.

The light beam is totally reflected in the optical waveguide body 2, and the step size of propagation (hereinafter collectively referred to as the total reflection step size) is S=2T·tan $\theta$, wherein n is the refractive index of the optical waveguide body 2, T is the thickness of the optical waveguide body 2, and d is the period of the in-coupling grating 1.

The period of the in-coupling grating 1 and that of the out-coupling grating can be the same. D is the width of the in-coupling grating 1 in the direction of beam propagation.

In order to be able to optimally ensure the two apparently-contradictory conditions of the second diffraction not occurring at the in-coupling grating 1 and the continuous expansion of the exit pupil at the out-coupling grating at the same time, when the parameters of the in-coupling grating 1, the out-coupling grating, and the optical waveguide body 2 are optimized, the parameters of the coupling grating 1, the coupling grating, and the optical waveguide body 2 can be optimized such that one of the two conditions that the second diffraction does not occur at the in-coupling grating 1 and the beam continuously expands to exit pupil at the out-coupling grating are met.

On the basis of one of the two conditions that the second diffraction does not occur at the in-coupling grating 1 and the beam continuously expand to exit pupil at the out-coupling grating is met, the parameters of the in-coupling grating 1, the out-coupling grating, and the optical waveguide body 2 are optimized to meet the other condition of that the second diffraction not occurring at the in-coupling grating 1 and the continuous exit pupil expansion at the out-coupling grating.

In these embodiments, it can be first ensured that no secondary diffraction occurs at the in-coupling grating 1, that is, the minimum total reflection step size $S_{min}$ corresponding to the minimum field of view angle is not less than the beam width D.

If the minimum field of view is expressed as $i_{min}$, the relationship between the parameters can be:

$$2T \cdot \tan\{\arcsin[\lambda/(nd)+\sin i_{min}/n]\} \geq D \quad (1),$$

wherein n is the refractive index of the optical waveguide body 2, T is the thickness of the optical waveguide body 2, and d is the period of the in-coupling grating 1. The periods of the in-coupling grating 1 and the out-coupling grating are the same. D is the width of the in-coupling grating 1 in the beam propagation direction, $\lambda$ is the wavelength of the light beam incident on the optical waveguide body 2, and $i_{min}$ is the minimum field of view angle of the light beam incident on the optical waveguide body 2.

In these embodiments, when the light beam incident into the optical waveguide body has a certain spectral width, it may be needed to ensure that the minimum wavelength $\lambda_{min}$ of the light beam satisfies the formula (1).

It can be seen from the foregoing analysis that at this time, the exit pupil of the out-coupling grating must be discontinuous, and the larger the total reflection step size (that is, the larger the field of view angle), the larger the exit pupil interval.

Therefore, a transmissive out-coupling grating 32 can be disposed on the light emitting surface of the beam coupling-out region, and a reflective out-coupling grating 31 can be disposed on the first surface of the beam coupling-out region opposite to the light emitting surface, to ensure that a light beam with the maximum total reflection step (i.e., maximum field of view) to have exit pupil continuity, such that all light beams with all total reflection steps have exit pupil continuity.

Figure 10:
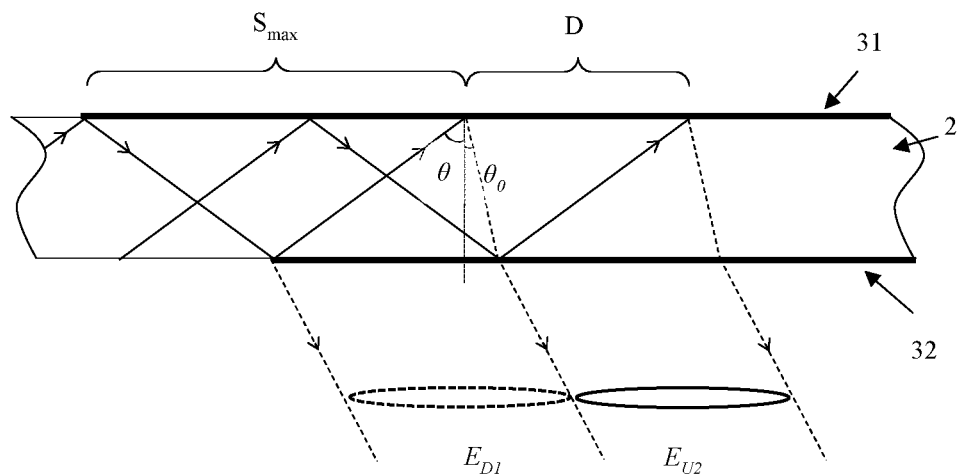
FIG. 10 is a schematic view illustrating the exit of a light beam having a maximum field of view angle.

As shown in FIG. 10, for a beam having a maximum field of view angle, the propagation distance from the first incidence of the reflective out-coupling grating 31 to the first incidence of the transmissive out-coupling grating 32 is half of a total reflection step.

The maximum misalignment interval between the initial end of the transmissive out-coupling grating 32 and the initial end of the reflective out-coupling grating 31 is half of the propagation step that a light beam incident on the optical waveguide body 2 at a maximum field of view angle and propagating within the optical waveguide body 2 in a total reflection manner, i.e., $S_{max}/2$, $$\text{wherein } S_{max} = 2T \cdot \tan\{\arcsin[\lambda/(nd)+\sin i_{max}/n]\} \quad (a)$$

wherein $i_{max}$ is the maximum field of view angle.

In these embodiments, when the light beam incident into the optical waveguide body has a certain spectral width, the wavelength k in the above formula (a) takes the minimum wavelength $\lambda_{min}$ of the incident light wavelength.

Referring to FIG. 8, the exit pupils extended by the reflective out-coupling grating 31 are denoted as $E_{U1}$, $E_{U2}$, $E_{U3}$, ..., and the exit pupils extended by the transmissive out-coupling grating 32 are denoted as $E_{D1}$, $E_{D2}$, $E_{D3}$, ..., the width of each exit pupil is equal to the beam width D.

According to the propagation path of the maximum field of view beam in FIG. 8, the distance between $E_{D1}$ and $E_{U2}$ is greater than the distance between $E_{D1}$ and $E_{U1}$, so as long as there is no gap between $E_{D1}$ and $E_{U2}$, there is no gap between all the exit pupils, that is, to ensure continuity.

The relationship between the parameters of the optical waveguide when there is no gap between $E_{D1}$ and $E_{U2}$ is derived below.

FIG. 10 shows the coupling of the $E_{D1}$ and $E_{U2}$ in the beam corresponding to the maximum field of view angle.

Figure 11:
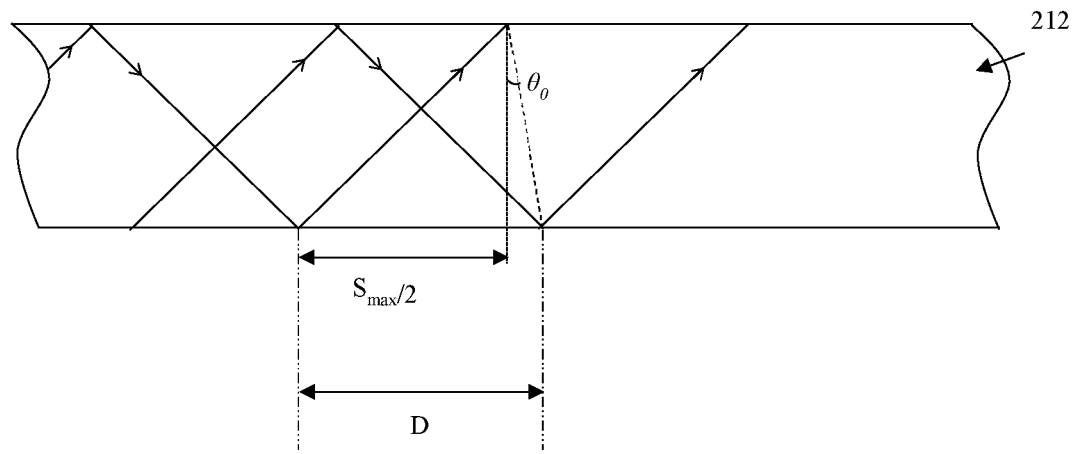
FIG. 11 is a schematic diagram illustrating the geometric relationship of the light beam of FIG. 10.

FIG. 11 is a schematic diagram of the geometric relationship in FIG. 10, wherein $\theta_0$ represents the incident angle of the reflective out-coupling grating, and $\theta$ represents the diffraction angle of the reflective out-coupling grating.

For $E_{U2}$, a light beam is transmitted from the reflective out-coupling grating 31 to the transmissive out-coupling grating 32, and the distance traveled forward in the optical waveguide body 2 is T·tan $\theta_0$, such that when $E_{D1}$ and $E_{U2}$ are just in close contact, according to FIG. 11, it can be seen that T·tan $\theta_0 = D - S_{max}/2$.

As such, if there is no gap between $E_{D1}$ and $E_{U2}$, then T·tan $\theta_0 \leq D - S_{max}/2$ need to be satisfied. Wherein $S_{max} = 2T \cdot \tan\{\arcsin[\lambda/(nd) + \sin i_{max}/n]\}$, so that:

$$T \cdot \tan[\arcsin(\sin i_{max}/n)] + T \cdot \tan\{\arcsin[\lambda/(nd) + \sin i_{max}/n]\} \leq D \quad (2)$$

The above formula (1) and formula (2) give the constraint relationships of the thickness T and the refractive index n of the optical waveguide body 2, the width D of the in-coupling grating 1 and the grating period d, and the field of view angle i of the incident light and wavelengths $\lambda$.

When the light beam incident into the optical waveguide body has a certain spectral width, it may be needed to ensure that the maximum wavelength $\lambda_{max}$ satisfies the formula (2).

When the above parameters satisfy the relationship, two conditions can be achieved simultaneously at the in-coupling grating 1 without secondary diffraction and having exit pupil continuity at the out-coupling grating.

In these embodiments, along the direction of propagation of the light beam within the optical waveguide body 2, the end of the transmissive out-coupling grating 32 is offset from the end of the reflective out-coupling grating 31.

Figure 12:
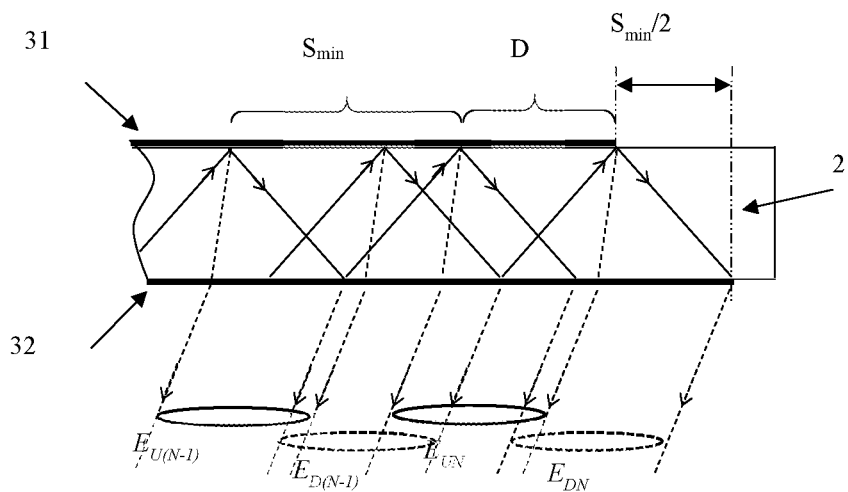
FIG. 12 is a schematic diagram illustrating a misalignment arrangement of the second end of the transmissive out-coupling grating and the second end of the reflective grating according to some embodiments of the present disclosure.

In some embodiments, the end of the reflective out-coupling grating 31 is located at a side of the end of the transmissive out-coupling grating 32, near the beam in-coupling region, as shown in FIG. 12.

Alternatively, the end of the reflective out-coupling grating 31 can be located on the side of the end of the transmissive out-coupling grating 32 away from the beam in-coupling region, as shown in FIG. 13.

In these embodiments, the misalignment interval between the end of the transmissive out-coupling grating 32 and the end of the reflective out-coupling grating 31 is half of the propagation step length of the beam propagating in the optical waveguide body 2 in a total reflection manner.

The light beam of the minimum field of view angle propagating in the optical waveguide body 2 in a total reflection manner has a minimum total reflection step, so that the exit pupil must be continuous.

The beam with the minimum field of view angle determines the maximum value of the misalignment interval in the direction of propagation of the beam, between the end of the transmissive out-coupling grating 32 and the end of the reflective out-coupling grating 31.

The maximum misalignment interval between the end of the reflective out-coupling grating 31 and the end of the reflective out-coupling grating 31 is half of the propagation step length when the light beam incident on the optical waveguide body 2 at a minimum field of view angle propagates in the optical waveguide body 2 in a total reflection manner.

As shown in FIG. 12, the last (Nth) extended exit pupil of the reflective out-coupling grating 31 and the transmissive out-coupling grating 32 are $E_{UN}$ and $E_{DN}$, respectively.

The last exit pupil of the optical waveguide body 2 can be $E_{DN}$ (referring to FIG. 12) or $E_{UN}$ (referring to FIG. 13).

The size of the misalignment interval between $E_{UN}$ and $E_{DN}$ can be half of the minimum total reflection step, i.e., $S_{min}/2$, wherein:

$$S_{min} = 2T \cdot \tan\{\arcsin[\lambda/(nd) + \sin i_{min}/n]\} \quad (b)$$

wherein $i_{min}$ is the minimum field of view angle. In a case that the incident light has a certain spectral width, the minimum wavelength $\lambda_{min}$ can be taken in equation (b).

It should be noted that the period of the in-coupling grating, the reflective out-coupling grating and the transmissive out-coupling grating according to some embodiments can be the same. The incident angle of the reflective out-coupling grating and the incident angle of the transmissive out-coupling grating can be the same. The diffraction angle of the reflective out-coupling grating can be the same as the diffraction angle of the transmissive out-coupling grating, and the incident angle of the reflective out-coupling grating (or the transmissive out-coupling grating) can be equal to the diffraction angle of the in-coupling grating.

Figure 14:
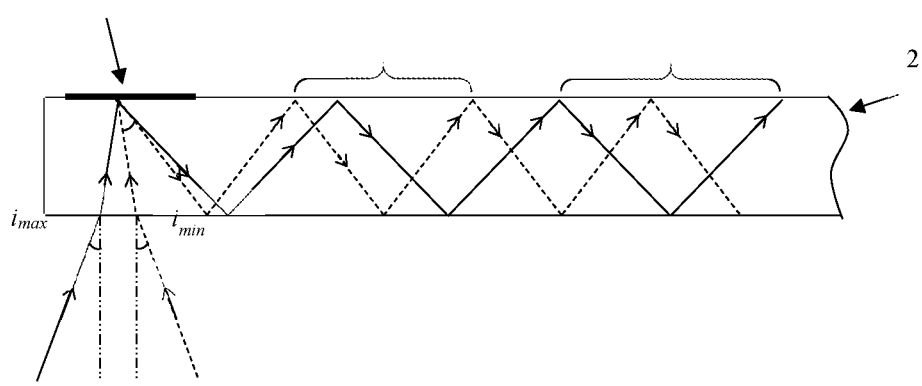
FIG. 14 is a diagram illustrating a definition of the maximum field of view angle and a minimum field of view angle.

It should be noted that the definitions of the maximum field of view angle $i_{max}$ and the minimum field of view angle $i_{min}$ in the above can be that as shown in FIG. 14.

The field of view angle can be defined as the angle between the incident ray and the surface normal of the optical waveguide body 2. The maximum field of view $i_{max}$ can indicate that the light at the field of view has a maximum total reflection step size $S_{max}$ after coupling into the optical waveguide body 2 via the in-coupling grating 1, and $S_{max}$ is shown as the solid line in FIG. 14.

The minimum field of view $i_{min}$ can mean that the light at the field of view has a minimum total reflection step size $S_{min}$ after being coupled into the optical waveguide body 2 via the in-coupling grating 1, $S_{min}$ is indicated by the dashed line in FIG. 14.

Various embodiments of the present disclosure can also provide a display device comprising the optical waveguide described above.

Various embodiments of the present disclosure can have one or more of the following advantages.

By providing a transmissive out-coupling grating on the light emitting surface of the optical waveguide body, and providing a reflective out-coupling grating on the first surface opposite to the light emitting surface, the light beam coupling into the grating can be ensured, without secondary diffraction and simultaneously have continuous exit pupil expansion.

In the present disclosure, it is to be understood that the terms "length," "width," "thickness," "inside," "outside," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly.

In the present disclosure, the terms "connected," "coupled," and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," a second element may indicate direct contact between the first and second elements, without contact, or indirect through an intermediate medium, unless otherwise explicitly stated and defined.

In the description of the present disclosure, the terms "one embodiment," "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An optical waveguide, comprising an optical waveguide body having a beam in-coupling region and a beam coupling-out region, wherein:
   the beam in-coupling region is provided with a coupling grating configured to couple a beam into the optical waveguide body, and have the beam propagate in a total reflection manner in the optical waveguide body;
   the beam coupling-out region is provided with an out-coupling grating configured to couple the light beam propagating to the beam coupling-out region out of the optical waveguide body, such that the beam does not undergo secondary diffraction at the coupling grating and have continuous exit pupil expansion;
   the out-coupling grating comprises a transmissive out-coupling grating and a reflective out-coupling grating disposed on two sides of the optical waveguide body parallel to a beam propagation direction;
   a first end of the transmissive out-coupling grating and a first end of the reflective out-coupling grating are disposed in a misalignment setting along the beam propagation direction in the optical waveguide body;
   a first distance between the first end of the reflective out-coupling grating and the in-coupling grating in the beam propagation direction is greater than a second distance between the first end of the transmissive out-coupling grating and the in-coupling grating in the beam propagation direction;
   a misalignment interval between the first end of the transmissive out-coupling grating and the first end of the reflective out-coupling grating is one half of a propagation step that the beam is totally reflected to propagate in the optical waveguide body;
   a maximum misalignment interval between an initial end of the transmissive coupling grating and an initial end of the reflective coupling prating is half of the propagation step of the light propagating within the optical waveguide body in a total reflective manner when the beam enters the optical waveguide body at a maximum field of view angle;
   a second end of the transmissive coupling grating and a second end of the reflective coupling grating are misaligned along the light beam propagation direction;
   the second end of the reflective out-coupling grating is located at a side of the transmissive out-coupling grating that is distal from the beam in- coupling region; and
   a misalignment interval between the second end of the transmissive out-coupling grating and the second end of the reflective out-coupling grating is half of the propagation step of the light beam propagating in a total reflection manner inside of the optical waveguide body.

2. The optical waveguide according to claim 1, wherein a first distance between the first end of the reflective out-coupling grating and the in-coupling grating in the beam propagation direction is smaller than a second distance between the first end of the transmissive out-coupling grating and the in-coupling grating in a beam propagation direction.

3. The optical waveguide according to claim 1, wherein the second end of the reflective out-coupling grating is located at a side of the transmissive out-coupling grating proximal to the beam in-coupling region.

4. The optical waveguide according to claim 1, wherein a maximum misalignment interval between the second end of the transmissive out-coupling grating and the second end of the reflective out-coupling grating is half of a propagation step of the light propagating in a total reflective manner within the optical waveguide body in a case that the light beam enters the optical waveguide at a minimum field of view angle.

5. An optical waveguide, comprising an optical waveguide body having a beam in-coupling region and a beam coupling-out region, wherein:
  the beam in-coupling region is provided with a coupling grating configured to couple a beam into the optical waveguide body, and have the beam propagate in a total reflection manner in the optical waveguide body;
  the beam coupling-out region is provided with an out-coupling grating configured to couple the light beam propagating to the beam coupling-out region out of the optical waveguide body, such that the beam does not undergo secondary diffraction at the coupling grating and have continuous exit pupil expansion;
  the out-coupling grating comprises a transmissive out-coupling grating and a reflective out-coupling grating disposed on two sides of the optical waveguide body parallel to a beam propagation direction; and
  parameters of the in-coupling grating and the out-coupling grating satisfy:

$$2T \cdot \tan\{\arcsin[\lambda/(nd) + \sin i_{min}/n]\} \geq D \quad (1)$$

$$T \cdot \tan[\arcsin(\sin i_{max}/n)] + T \cdot \tan\{\arcsin[\lambda/(nd) + \sin i_{max}/n]\} \leq D \quad (2)$$

wherein:
n is a refractive index of the optical waveguide body;
T is a thickness of the optical waveguide body;
d is a period of the coupling grating;
periods of the in-coupling grating and the out-coupling grating are same;
D is a width of the in-coupling grating in the beam propagation direction;
$\lambda$ is a wavelength of the light beam incident on the optical waveguide body;
$i_{min}$ is a minimum field of view angle of the light beam incident on the optical waveguide body; and
$i_{max}$ is a maximum field of view angle of the beam incident on the optical waveguide body.

6. The optical waveguide according to claim 5, wherein in a case that the light beam incident on the optical waveguide body has a specified spectral width, a minimum wavelength $\lambda_{min}$ of the light beam satisfies formula (1), and a maximum wavelength $\lambda_{max}$ of the light beam satisfies formula (2).

7. The optical waveguide according to claim 1, wherein:
  the beam in-coupling region comprises an incident surface, and a second surface opposing the incident surface; and
  the in-coupling grating is a reflective in-coupling grating, and is disposed at the second surface.

8. A display device comprising an optical waveguide, comprising an optical waveguide body having a beam in-coupling region and a beam coupling-out region, wherein:
  the beam in-coupling region is provided with a coupling grating configured to couple a beam into the optical waveguide body, and have the beam propagate in a total reflection manner in the optical waveguide body;
  the beam coupling-out region is provided with an out-coupling grating configured to couple the light beam propagating to the beam coupling-out region out of the optical waveguide body, such that the beam does not undergo secondary diffraction at the coupling grating and have continuous exit pupil expansion;
  the out-coupling grating comprises a transmissive out-coupling grating and a reflective out-coupling grating disposed on two sides of the optical waveguide body parallel to a beam propagation direction;
  the display device comprises an augmented reality (AR) device; and
  a maximum misalignment interval between a first end of the transmissive out-coupling grating and a first end of the reflective out-coupling grating is half of a propagation step that the light beam incident on the optical waveguide body at a maximum field of view angle and propagating within the optical waveguide body in a total reflection manner, i.e., $S_{max}/2$, $$S_{min} = 2T \cdot \tan\{\arcsin[\lambda/(nd) + \sin i_{min}/n]\}. \quad (a)$$

wherein imax is the maximum field of view angle.

9. The display device according to claim 8, wherein the transmissive out-coupling grating and the reflective out-coupling grating are misaligned.

10. The display device according to claim 9, wherein:
  a last (Nth) extended exit pupil of the reflective out-coupling grating and the transmissive out-coupling grating are $E_{UN}$ and $E_{DN}$, respectively; and
  a size of a misalignment interval between $E_{UN}$ and $E_{DN}$ is half of a minimum total reflection step, i.e., $S_{min}/2$, wherein:

$$S_{min} = 2T \cdot \tan\{\arcsin[\lambda/(nd) + \sin i_{min}/n]\}. \quad (b)$$

11. The display device according to claim 8, wherein the optical waveguide comprises a holographic waveguide.

12. The display device according to claim 8, further comprising a spectroscopic film configured to reduce a total reflection step size.

* * * * *